United States Patent
Hanaoka et al.

(10) Patent No.: US 8,473,784 B2
(45) Date of Patent: Jun. 25, 2013

(54) STORAGE APPARATUS AND METHOD OF DATA PROCESSING

(75) Inventors: Yuji Hanaoka, Kawasaki (JP); Terumasa Haneda, Kawasaki (JP); Atsushi Uchida, Kawasaki (JP); Yoko Kawano, Kawasaki (JP); Emi Narita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/801,060

(22) Filed: May 19, 2010

(65) Prior Publication Data

US 2010/0306586 A1 Dec. 2, 2010

(30) Foreign Application Priority Data

May 26, 2009 (JP) ................................ 2009-126944

(51) Int. Cl.
 *G06F 11/00* (2006.01)
(52) U.S. Cl.
 USPC .............. 714/20; 714/6.1; 714/14; 714/15; 714/24
(58) Field of Classification Search
 USPC ................... 714/14, 15, 20, 24, 6.1
 See application file for complete search history.

(56) References Cited

U.S. PATENT DOCUMENTS

| | | | |
|---|---|---|---|
| 7,783,845 B2 * | 8/2010 | Bennett et al. | 711/159 |
| 7,836,339 B2 * | 11/2010 | Leete et al. | 714/22 |
| 8,154,259 B2 * | 4/2012 | Sartore | 320/167 |
| 2003/0099134 A1 * | 5/2003 | Lasser et al. | 365/185.29 |
| 2009/0198931 A1 * | 8/2009 | Ohyama et al. | 711/162 |
| 2010/0202240 A1 * | 8/2010 | Moshayedi et al. | 365/229 |
| 2010/0250832 A1 * | 9/2010 | Zhang et al. | 711/103 |
| 2010/0299558 A1 * | 11/2010 | Tojo et al. | 714/14 |

FOREIGN PATENT DOCUMENTS

JP 2003-256295 9/2003

* cited by examiner

*Primary Examiner* — Charles Ehne
(74) *Attorney, Agent, or Firm* — Staas & Halsey LLP

(57) ABSTRACT

A storage apparatus includes a backup processing unit that stores data stored in a first memory into a second memory as backup data upon occurrence of a power failure, a restore processing unit that upon recovery from the power failure restores the backup data backed up in the second memory to the first memory and erases the backup data, and an erasure processing termination unit that terminates the erasure processing upon a power failure occurring during erasure processing for erasing the backup data stored in the second memory, and a re-backup processing unit that re-backs up data in the first memory corresponding to the backup data erased from the second memory before the erasure processing is terminated by the erasure processing termination unit to a location in the second memory subsequent to a last location that contains the backup data which has not been erased.

8 Claims, 8 Drawing Sheets

STORAGE APPARATUS AND METHOD OF DATA PROCESSING

CROSS-REFERENCE TO RELATED APPLICATION

This application is related to and claims priority to Japanese Patent Application No. 2009-126944, filed on May 26, 2009, and incorporated herein by reference.

FIELD

The embodiments discussed herein are directed to a storage apparatus and a method of data processing.

BACKGROUND

A technique has been proposed that backs up data while supply of power to a storage apparatus is stopped (see, for example, Japanese Laid-open Patent Publication No. 2003-256295).

In addition, some of redundant arrays of inexpensive (independent) disks (RAID) apparatuses have the capability of performing power failure processing or power recovery processing to protect data integrity at the time of a power failure. The power failure processing backs up cache data stored in a cache memory to a flash memory upon occurrence of a power failure. The power recovery processing restores the data backed up in the flash memory to the cache memory.

The power failure processing and power recovery processing will be briefly described below. Upon power failing, the controller of a RAID apparatus backs up cache data stored in a cache memory to a flash memory (power failure processing) using power charged in a capacitor (super capacitor). Upon power being recovered, the controller of the RAID apparatus restores the data backed up in the flash memory to the cache memory (power recovery processing). In addition, the controller erases the data of all the data blocks of the flash memory (erasure processing) during the power recovery processing while sufficient power is available.

Upon a power failure occurring during the power recovery processing, power failure processing is performed subsequent to the completion of erasure processing. However, it is difficult to perform power failure processing using only the power charged in the capacitor subsequent to the completion of the erasure processing. This may result in loss of the cache data. Hence, referring to FIG. 8, for example, a technique has been proposed providing a RAID apparatus having a redundant configuration with two distributed controllers (CPUs), one controller performs power recovery processing after the other controller has completed power recovery processing.

However, the technique of coping with a power failure during power recovery processing by providing a RAID apparatus with two controllers cannot be used for a RAID apparatus with a single controller, and hence loss of cache data cannot be prevented.

Furthermore, even if the controller of a RAID apparatus has a redundant configuration, power charged in a capacitor (super capacitor) may not be sufficient for performing power recovery processing subsequent to erasure processing. Accordingly, cache data may be lost.

SUMMARY

It is an aspect of the embodiments discussed herein to provide a storage apparatus and a method of storage processing.

According to an aspect of an embodiment, a storage apparatus includes a backup processing unit that stores data stored in a first memory into a second memory as backup data upon occurrence of a power failure, a restore processing unit that upon recovery from the power failure restores the backup data backed up in the second memory to the first memory and erases the backup data, and an erasure processing termination unit that terminates the erasure processing upon a power failure occurring during erasure processing for erasing the backup data stored in the second memory, and a re-backup processing unit that re-backs up data in the first memory corresponding to the backup data erased from the second memory before the erasure processing is terminated by the erasure processing termination unit to a location in the second memory subsequent to a last location that contains the backup data which has not been erased.

According to an aspect of an embodiment, a method of backing up in a storage apparatus includes storing data stored in a first memory into a second memory as backup data upon occurrence of a power failure; restoring, upon recovery from the power failure, the backup data backed up in the second memory to the first memory and erasing the backup data stored in the second memory; terminating, upon a power failure occurs during erasure processing for erasing the backup data stored in the second memory, the erasure processing; and re-backing up data in the first memory corresponding to the backup data erased from the second memory before the erasure processing is terminated in the terminating operation to a location in the second memory subsequent to a last location that contains the backup data which has not been erased by the erasure processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Exemplary embodiments of a storage apparatus and a method of data processing are disclosed.

A storage apparatus according to a first exemplary embodiment performs power failure processing to backup data by storing the data stored in a cache memory into the data blocks of a flash memory upon occurrence of a power failure. The storage apparatus according to a first embodiment, upon recovery from a power failure, performs power recovery processing by restoring the back-up data stored in the flash memory to the cache memory and by erasing the backup data in all the data blocks of the flash memory, from the first to the last. In the power recovery processing, the storage apparatus according to the first embodiment backs up data in the storage apparatus while supply of power is stopped.

Upon a power failure occurring during erasure processing in the power recovery processing, the erasure processing is terminated. Data in the cache memory corresponding to the backup data that had been erased from the flash memory before the erasure processing was terminated is written into the flash memory at a location starting from a block following the last block of the flash memory storing the backup data that has not been erased by the erasure processing, whereby re-backing up is performed.

Figure 1:
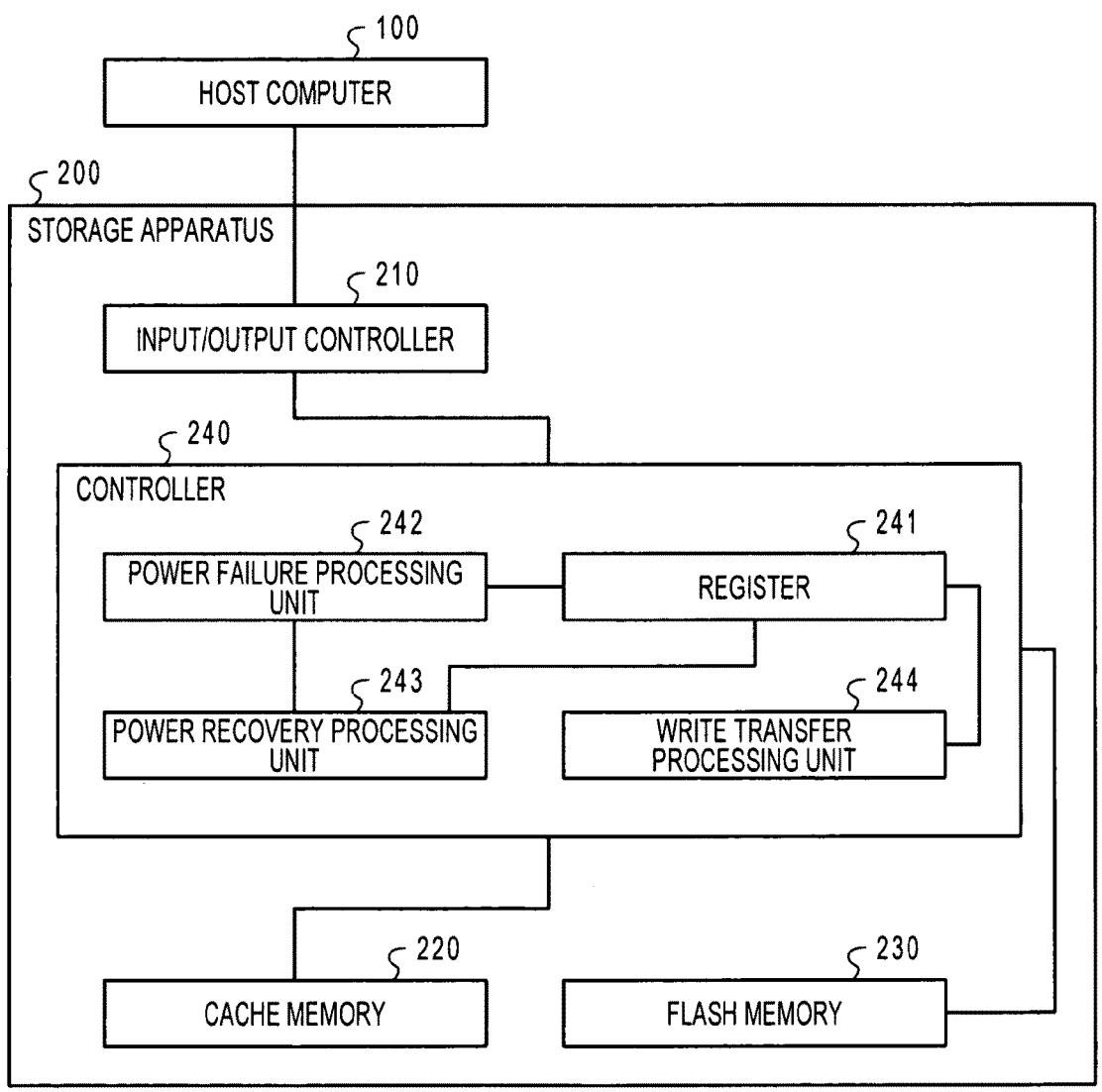
FIG. 1 illustrates an exemplary storage apparatus.

FIG. 1 illustrates a an exemplary storage apparatus.

Referring to FIG. 1, a storage apparatus 200 according to a first embodiment may be connected to a host computer 100 in a state where communication is possible. The storage apparatus 200 includes an input/output controller 210, a cache memory 220, a flash memory 230, and a controller 240.

The input/output controller 210 controls input/output of various kinds of information communicated between the host computer 100 and the input/output controller 210. For example, the input/output controller 210 controls input of a data processing request transmitted from the host computer 100.

The cache memory 220 stores therein data for processing performed by the controller 240, allowing the controller 240 high-speed access to the data. The flash memory 230 backs up data stored in the cache memory 220.

The controller 240, by reading a predetermined control program, programs specifying various processing procedures, and necessary data, from the cache memory 220, executes various kinds of processing such as control of the storage apparatus 200, operations and processing on data, and the like. Referring again to FIG. 1, the controller 240 includes a register 241; a power failure processing unit 242, functioning as a backup processing unit and a re-backup processing unit; a power recovery processing unit 243, functioning as a restore processing unit and an erasure processing termination unit; and a write transfer processing unit 244.

The register 241 stores data required for the processing performed by the power failure processing unit 242, the power recovery processing unit 243, and the write transfer processing unit 244. For example, the register 241 receives, from the power recovery processing unit 243, and stores the setting of a read transfer (restore) completion address (RD#_PNT) within the flash memory 230.

The register 241 receives, from the power recovery processing unit 243, and stores the setting of bit information for terminating erasure processing upon a power failure occurring during the erasure processing performed by the power recovery processing unit 243.

The register 241 receives, from the power recovery processing unit 243, and stores the setting of a completion address (RES#_PNT) indicating an erasure processing completion location in the flash memory 230 when the erasure processing performed by the power recovery processing unit 243 has been terminated.

The register 241 receives, from the power recovery processing unit 243, and stores the setting of a descriptor for write transfer that re-backs up data that has been erased from the flash memory 230. For example, the descriptor for write transfer includes a write transfer start address (WT#_FLA) in the flash memory 230 and the size (corresponding to the blocks that have been erased) of transfer to the flash memory 230.

The register 241 stores bit information (for example, "1") set by the write transfer processing unit 244 at the start of write transfer processing.

The power failure processing unit 242, upon occurrence of a power failure, performs power failure processing for backup by storing data stored in the cache memory in the data blocks of the flash memory 230.

The power recovery processing unit 243, upon recovery from a power failure, restores data in the flash memory 230 to the cache memory 220, and performs power recovery processing for erasing data stored in all the data blocks of the flash memory 230, from the first to the last.

The power recovery processing unit 243 terminates the erasure processing upon a power failure occurs during the execution of erasure processing in the power recovery processing. In addition, the power recovery processing unit 243 creates a descriptor for re-backing up (write-transferring) the data erased by the erasure processing and stores the descriptor in the register 241.

The power recovery processing unit 243, upon completion of write transfer performed by the write transfer processing unit 244, performs power recovery processing again (second power recovery processing).

The write transfer processing unit 244 backs up (write-transfers) again (re-backs up) the data erased by the erasure processing from the cache memory 220 to the flash memory 230 based on the descriptor for write transfer set in the register 241 by the power recovery processing unit 243.

Programs A and B, operating in a non-privilege mode, may have virtual address spaces mapped to physical address areas different from each other. A common memory is a physical address area to which a portion of each of the virtual address spaces of the programs A and B is mapped.

Processing of storage apparatus performed by the storage apparatus according to an exemplary embodiment is described with reference to the drawings.

Figure 2:
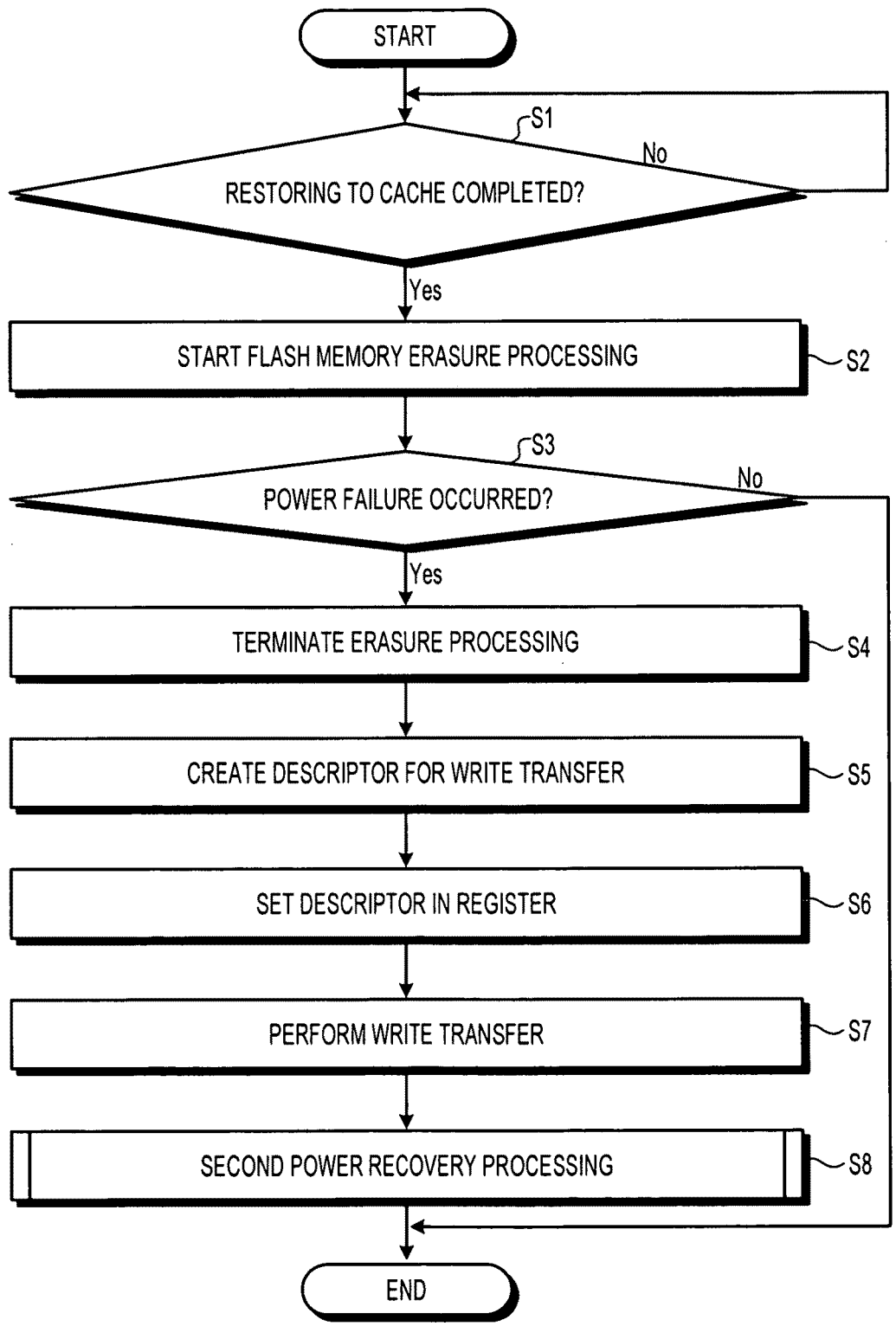
FIG. 2 illustrates a processing flow performed by a storage apparatus.

Erasure processing termination and write transfer processing g according to a first embodiment are described with reference to FIGS. 2 and 3. Referring to FIG. 2, upon restoring (read-transferring) of backup data from the flash memory 230 to the cache memory 220 is completed upon recovery from a power failure (Yes in S1), the power recovery processing unit 243 starts erasure processing for the flash memory 230 (S2).

The power recovery processing unit 243 monitors occurrence of a power failure during the erasure processing (S3). Upon occurrence of a power failure during the erasure processing is detected (Yes in S3), the power recovery processing unit 243 terminates the erasure processing (S4) by setting bit information for causing the erasure processing to be terminated in the register 241. The power recovery processing unit 243 completes erasure of a data block in the flash memory 230 that was being erased upon the power failure occurring. The power recovery processing unit 243 sets in the register 241 an erasure completion address (ERS#_PNT) illustrated in FIG. 3 indicating a location within the flash memory 230 up to which the erasure processing has been completed.

Figure 3:
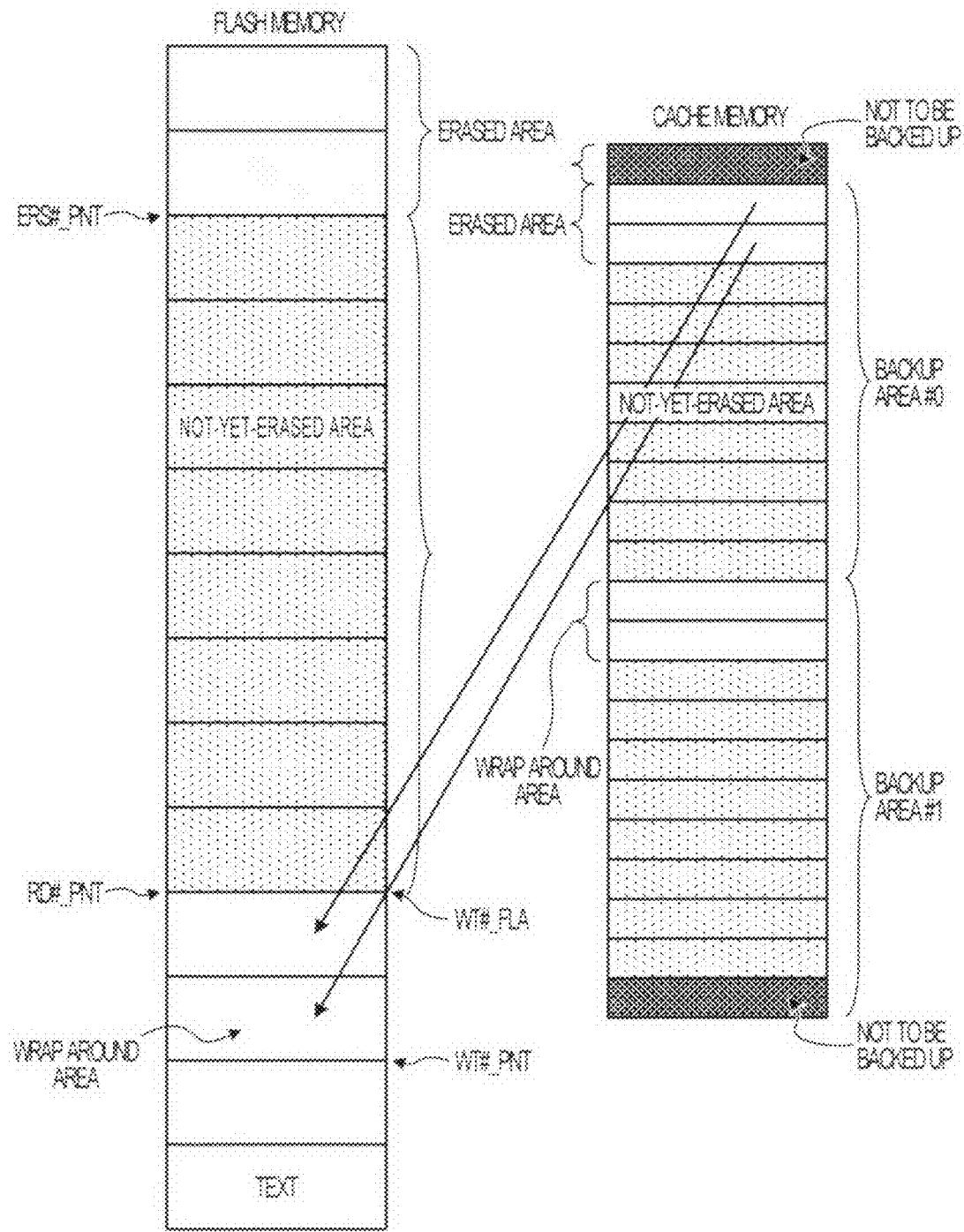
FIG. 3 illustrates processing performed by an exemplary the storage apparatus.

FIG. 3 illustrates power failure occurring during erasure subsequent to power recovery. Subsequent to the erasure processing termination, the power recovery processing unit 243 creates a descriptor for write transfer (S5). For example, as illustrated in FIG. 3, the power recovery processing unit 243 makes the read transfer (restore) completion address (RD#_PNT) within the flash memory 230 be a write transfer start address (WT#_FLA). In other words, write transfer is started from a block subsequent to the last block in the flash memory 230 containing the backup data that has not been erased by the erasure processing.

The power recovery processing unit 243 computes the size of transfer corresponding to the data blocks erased from the flash memory 230, based on the erasure completion address (ERS#_PNT) illustrated in FIG. 3. If there are bad blocks causing data read/write trouble, the transfer size may be computed taking into consideration the number of bad blocks. The information about bad blocks is stored in "BLKL" illustrated in FIG. 3.

The power recovery processing unit 243 creates a transfer descriptor that contains the write transfer start address (WT#_FLA) within the flash memory 230 and the size (transfer size corresponding to the data blocks having been erased) of transfer to the flash memory 230.

The power recovery processing unit 243 sets the created transfer descriptor in the register 241 (S6).

The write transfer processing unit 244 performs write transfer for re-backing up the data erased by the erasure processing from the cache memory 220 to the flash memory 230 based on the transfer descriptor set in the register 241 by the power recovery processing unit 243 (S7).

Upon the occurrence of a power failure not being detected (No in S3), the power recovery processing unit 243 ends the processing upon completion of the erasure processing.

In S8, upon the write transfer being performed by the write transfer processing unit 244 is completed, the power recovery processing unit 243 performs second power recovery processing (see FIGS. 4 and 5) and ends the processing.

Figure 4:
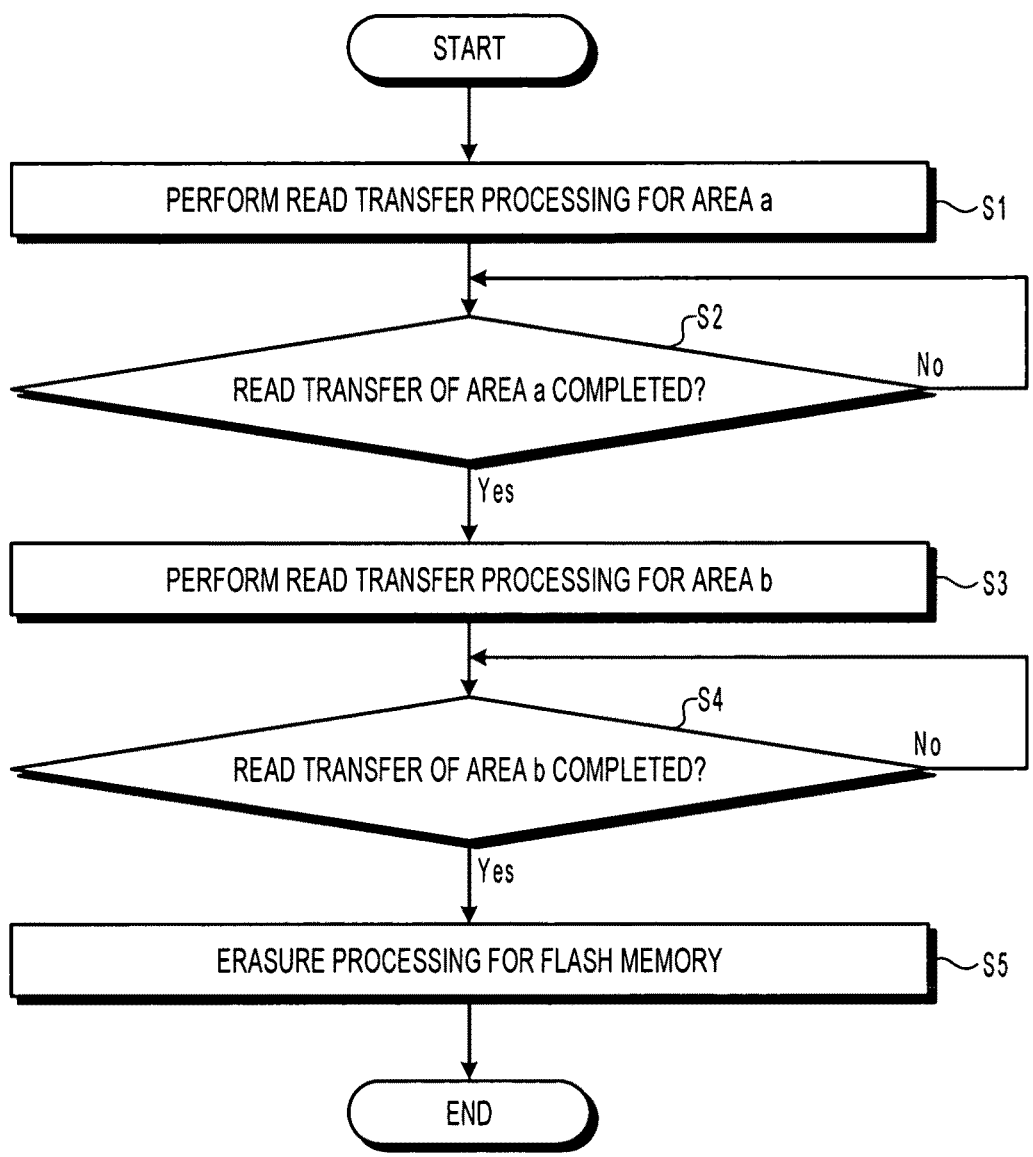
FIG. 4 illustrates a processing flow performed by the storage apparatus according to a first embodiment.
Figure 5:
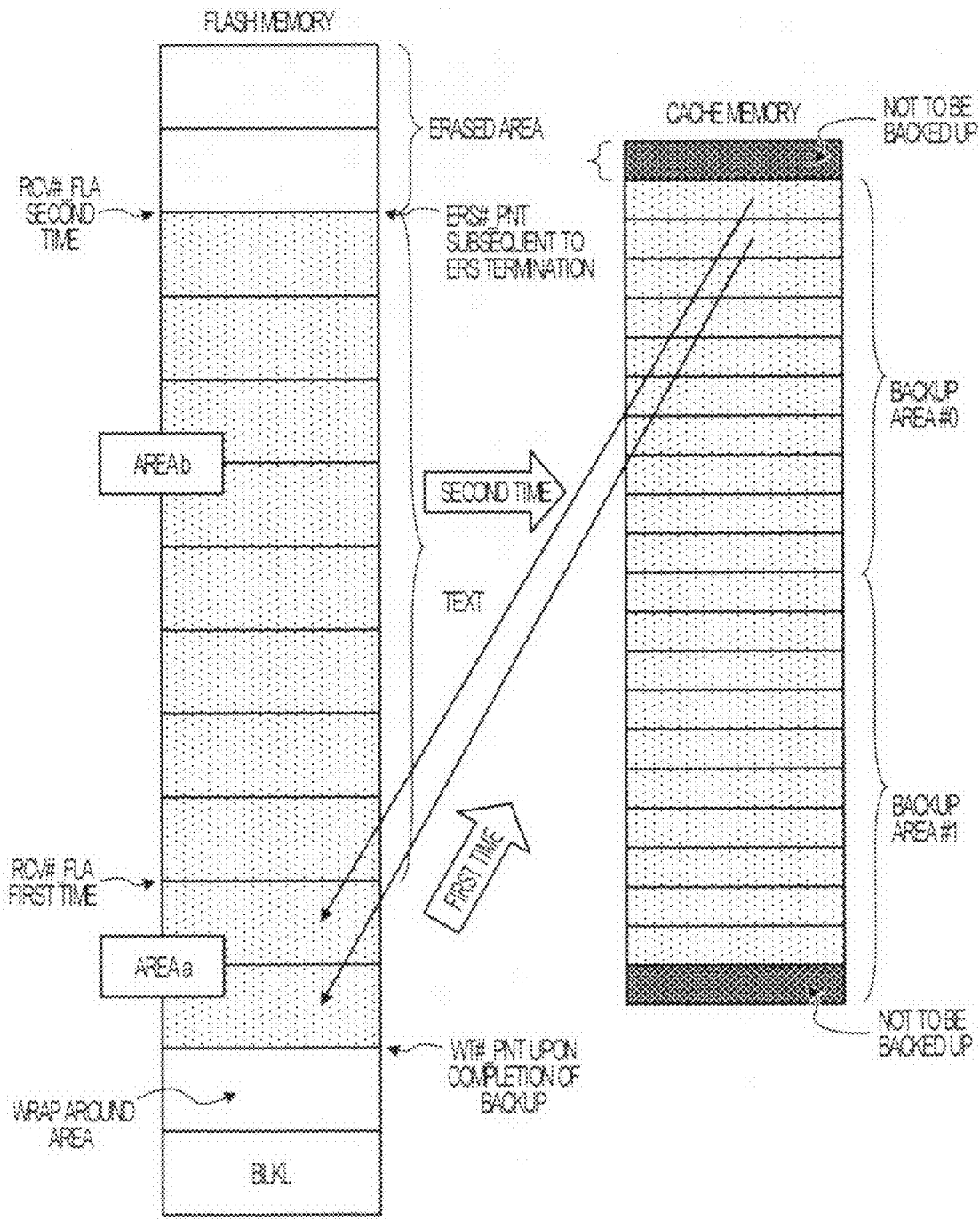
FIG. 5 illustrates processing performed by a storage apparatus according to a first embodiment.

The flow of second power recovery processing subsequent to the completion of write transfer processing is described with reference to FIGS. 4 and 5. FIG. 5 illustrates at time of power recovery. Referring to FIG. 4, upon the write transfer being completed by the write transfer processing unit 244, the power recovery processing unit 243 performs processing for read transfer from the backup data in an area a (see FIG. 5) for which write transfer processing has been performed in connection with the erasure processing (S41). Note The power recovery processing unit 243 has recorded the address (RCV#_FLA (first time)) of the first block of data backed up from the cache memory 220 to the area a by the write transfer performed by the write transfer processing unit 244, and performs read transfer processing based on this address of the first block of the area a and the size of the area a.

The power recovery processing unit 243 waits for the read transfer of the area a to be completed, and upon the read transfer of the area a is completed (Yes in S42), the power recovery processing unit 243 performs read transfer processing for the backup data in an area b (S43). The backup data in the area b is backup data that remains without being erased since the erasure processing has been terminated by a power failure. The power recovery processing unit 243 has recorded the address (RCV#_FLA (second time)) of the first block of data remaining in the area b of the flash memory 230 due to the termination of erasure processing, and performs read transfer processing based on this address of the first block of the area b and the size of the area b.

The power recovery processing unit 243 waits until the read transfer of the area b is completed (S44), and upon the read transfer of the area b being completed (Yes in S44), the power recovery processing unit 243 performs erasure processing for the flash memory 230 (S45) and ends the processing. The power recovery processing unit 243 performs erasure processing for the whole area of the flash memory 230 continuing from the erasure completion address (ERS#_PNT, see FIG. 5) of the flash memory 230 at which the erasure processing has been terminated due to a power failure.

In the second power recovery processing, the area a, which has been transferred from the cache memory 220 in connection with the erasure processing, is transferred to the cache memory 220 by read transfer, and then the area b, which remains in the flash memory 230 without being erased since the erasure processing has been terminated due to a power failure, is transferred respectively based on the address (RCV#_FLA (first time)) of the first block of the area a and the size of the area a, and the address (RCV#_FLA (second time)) of the first block of the area b and the size of the area b. The execution of processing in the above sequence realizes restoring data from the flash memory 230 to the cache memory 220 similarly to the case in which a power failure does not occur during erasure processing.

According to a first exemplary embodiment, upon a power failure occurring s during execution of erasure processing, the erasure processing is terminated. Data in the cache memory 220 corresponding to the backup data that has been erased from the flash memory 230 prior to the termination of the erasure processing is transferred (re-backed up) by write transfer to the flash memory 230 starting from a block subsequent to the last block which contains backup data that has not been erased by the erasure processing.

Accordingly, the loss of cache data is prevented with high certainty even upon a power failure occurs during power recovery processing in a storage apparatus such as a RAID apparatus provided with a single controller.

In addition, re-backup is performed by restoring data from a block within the flash memory 230 subsequent to the last block which contains backup data that has not been erased by erasure processing. Hence the number of write operations and the number of erasure operations can be equally distributed among the data blocks within the flash memory 230. This allows the flash memory 230 to be efficiently utilized upon the flash memory 230 is a NAND flash memory, which has, as a characteristic thereof, restrictions on the numbers of write and erasure operations, since they are equally distributed.

Furthermore, it is possible to realize restoring of data from the flash memory 230 to the cache memory 220 similarly to the case in which a power failure does not occur during erasure processing.

Figure 6:
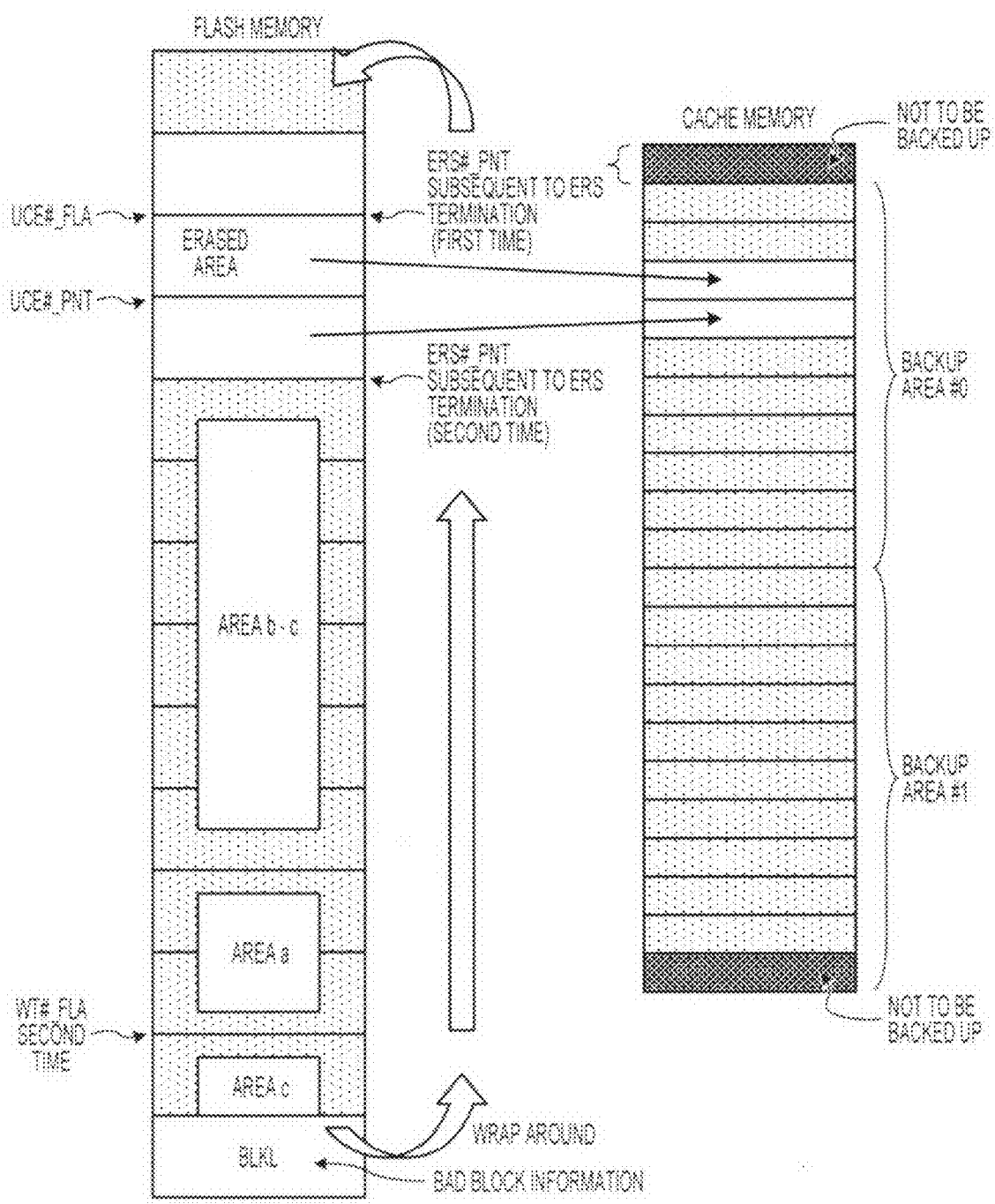
FIG. 6 illustrates processing performed by a storage apparatus according to a second embodiment.

Processing upon a power failure occurring during the execution of erasure processing within the second power recovery processing is described. FIG. 6 illustrates the processing performed by a storage apparatus according to a second exemplary embodiment. FIG. 6 illustrates power failure occurring during erasure subsequent to second power recovery.

Upon recovery from a power failure (power recovery), backup data is restored (read transfer) from the flash memory 230 to the cache memory 220 (see FIGS. 4 and 5). Upon the restoring (read transfer) is completed, the power recovery processing unit 243 performs erasure processing starting from "UCE#_PNT" illustrated in FIG. 6. The "UCE#_PNT" corresponds to "ERS#_PNT" illustrated in FIG. 5 and is set in the register 241.

Upon a power failure occurring again during the erasure processing subsequent to the second power recovery, the power recovery processing unit 243, similarly to the first embodiment, creates a write transfer descriptor and the write transfer processing unit 244 performs write transfer starting from "WT#_FLA (second time)" illustrated in FIG. 6. The "WT#_FLA (second time)" corresponds to "WT#_PNT upon completion of backup" illustrated in FIG. 5, and is set in the register 241.

Upon the last area of the flash memory 230 has been reached during the write transfer processing, the power recovery processing unit 243 continues the processing from the head area of the flash memory 230 by wrapping around, skipping the "BLKL" area. The power recovery processing unit 243 wraps around by recognizing the "BLKL" area based on the area code (indicating that bad blocks are stored) contained in the "BLKL" area.

Processing subsequent to the completion of the write transfer processing is third power recovery processing subsequent to the second recovery from a power failure, similarly to the first embodiment (see FIG. 4). That is, read transfer (list) is performed in the order of area a→area c→area b-c, and upon the read transfer is completed, erasure processing is performed for the flash memory 230. Upon a power failure does not occur during the erasure processing, the processing ends upon completion of the erasure processing.

Loss of cache data is prevented with high certainty even upon a power failure occurs during the execution of erasure processing within the second power recovery processing, and a flash memory can be most efficiently utilized since the numbers of write and erasure operations are equally distributed.

Other exemplary embodiments of a storage apparatus and a method of data processing are described.

The components of the storage apparatus 200 illustrated in FIG. 1 are functional and need not necessarily be physically configured as illustrated. For example, the specific distribution/integration configuration of the storage apparatus 200 is not limited to the illustration. The power recovery processing unit 243 and the write transfer processing unit 244 may be functionally or physically integrated, for example.

The whole or part of the storage apparatus 200 may be configured so as to be functionally or physically distributed or integrated in any unit in accordance with the various loads or usage. Furthermore, the whole or any part of the processing functions (see FIGS. 2 and 4, for example) in the storage apparatus 200 may be realized by a CPU 340 and a program analyzed and executed by the CPU 340, as will be described below with reference to FIG. 7, or may be realized by wired-logic hardware.

An exemplary method of data processing storage is described.

An exemplary method of data processing includes a power failure processing operation of storing data stored in a first memory into the blocks of a second memory (as backup data) upon occurrence of a power failure, a power recovery operation of restoring, upon recovery from the power failure, the backup data in the second memory to the first memory and erasing all the blocks of the second memory, from the head to the last; an erasure processing terminating operation (see, for example, S3 and S4 in FIG. 2) of terminating the erasure processing, upon a power failure occurring during the erasure processing in the power recovery processing operation; and a re-backing up operation (see, for example, S5 to S7 in FIG. 2) of re-backing up data in the first memory corresponding to the backup data, erased from the second memory before the erasure processing is terminated in the erasure processing terminating operation, to blocks in the second memory subsequent to the last block that contains the backup data which has not been erased by the erasure processing.

Figure 7:
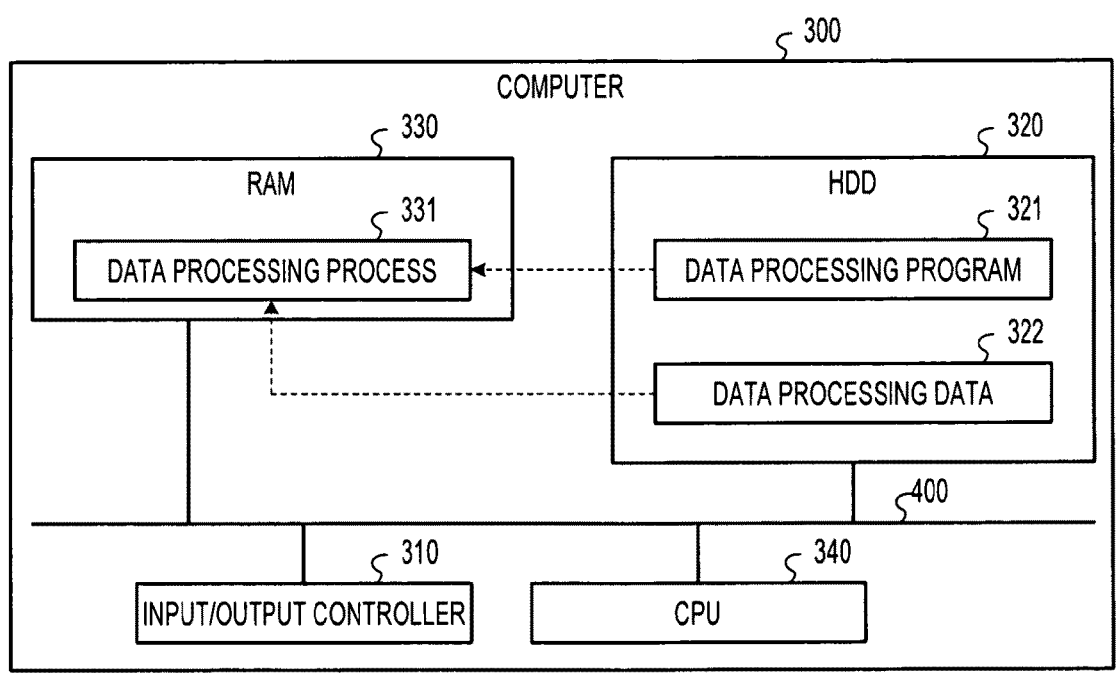
FIG. 7 is a diagram of a computer executing a data processing program according to a second embodiment.
Figure 8:
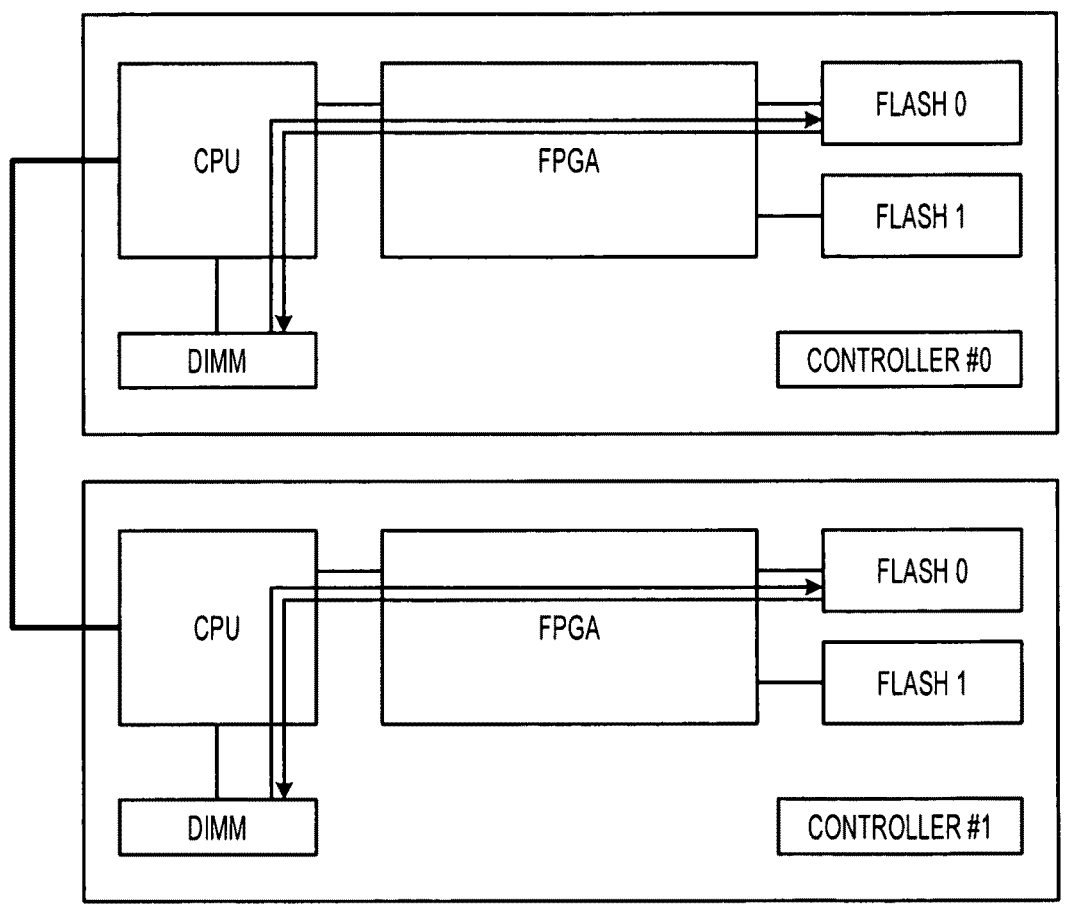
FIG. 8 illustrates a related art technique.

The various kinds of processing (see FIGS. 2 and 4, for example) performed by the storage apparatus 200 may be realized by a computer system such as a personal computer or a work station executing a program prepared in advance. An exemplary computer executing a data processing program having similar functions as those of the storage apparatus 200 described in the above embodiments is described with reference to FIG. 7. FIG. 7 is a diagram of a computer executing a data processing program according to an exemplary second embodiment.

Referring to FIG. 7, a computer 300 as the storage apparatus 200 includes connecting an input/output controller 310, an HDD 320, a RAM 330, and a CPU 340 to one another using a bus 400.

The input/output controller 310 controls input/output of various kinds of information. The HDD 320 stores information necessary for various kinds of processing executed by the CPU 340. The RAM 330 temporarily stores various kinds of information. The CPU 340 executes various kinds of operation processing.

Referring to FIG. 7, the HDD 320 contains a data processing program 321 having functions similar to those of the processing units of the storage apparatus 200 illustrated in FIG. 1 and data processing data 322. The data processing program 321 may appropriately be distributed so as to be stored in the memories of other computers connected by a network in a state where communication is possible.

The data processing program 321 may be loaded from the HDD 320 into the RAM 330 by the CPU 340, whereby the data processing program 321 functions as a data processing process 331, as illustrated in FIG. 7. In other words, the data processing process 331 loads the data processing data 322 and the like for data processing from the HDD 320 into an area of the RAM 330 assigned thereto, and executes various kinds of processing based on this loaded data and the like. The data processing process 331 corresponds to processing executed by the controller 240 (the power failure processing unit 242, the power recovery processing unit 243, the write transfer processing unit 244, or the like) of the storage apparatus 200 illustrated in FIG. 1.

The data processing program 321 need not be stored in the HDD 320 in advance. For example, the computer 300 may read and execute the program stored in advance, in units of subprograms as required, in a "removable physical medium" mounted in the computer 300, such as a flexible disk (FD), a CD-ROM, a DVD disc, a magneto optical disk, or an IC card, or in "other computers (or servers)" connected to the computer 300 using a public line, the Internet, a LAN, a WAN, or the like.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A storage apparatus that stores data comprising:
   a first memory;
   a second memory; and
   a processor configured to execute a process including:
   storing data stored in the first memory into the second memory as backup data upon occurrence of a power failure;
   restoring, upon recovery from the power failure, the backup data backed up in the second memory to the first memory and erasing the backup data stored in the second memory;
   terminating, upon a power failure occurring during an erasure processing for erasing the backup data stored in the second memory, the erasure processing; and
   re-backing up data in the first memory that corresponds to the backup data erased from the second memory to the second memory before the erasure processing is terminated, and
   wherein the re-backing up starts from a location subsequent to a last location that contains the backup data which has not been erased by the erasure processing.

2. The storage apparatus according to claim 1, wherein the backup data is restored after restoring of the backup data re-backed up by the re-backing is completed.

3. The storage apparatus according to claim 2, wherein, subsequent to restoring of the backup data including the re-backed up backup data, upon a power failure occurring during execution of an erasure processing in the restoring, the erasure processing is terminated, and
   wherein the data in the first memory corresponding to the backup data erased from the second memory is re-backed before the erasure processing is terminated to a location in the second memory subsequent to a last location that contains the re-backed up data which has not been erased by the erasure processing.

4. A method of backing up in a storage apparatus, the method comprising:
   storing data stored in a first memory into a second memory as backup data upon occurrence of a power failure;
   restoring, upon recovery from the power failure, the backup data backed up in the second memory to the first memory and erasing the backup data stored in the second memory;
   terminating, upon a power failure occurring during an erasure processing for erasing the backup data stored in the second memory, the erasure processing; and
   re-backing up data in the first memory that corresponds to the backup data erased from the second memory to the second memory before the erasure processing is terminated, and
   wherein the re-backing up starts from a location subsequent to a last location that contains the backup data which has not been erased by the erasure processing.

5. The method of backing up in a storage apparatus according to claim 4, wherein the backup data is restored after restoring of the backup data re-backed up in the re-backing up is completed.

6. The method of backing up in a storage apparatus according to claim 5,
   wherein subsequent to restoring of the backup data including the re-backed up backup data, upon a power failure occurring during execution of an erasure processing executed in the restoring, the erasure processing is terminated, and
   wherein the data in the first memory corresponding to the backup data erased from the second memory is re-backed before the erasure processing is terminated to a location in the second memory subsequent to a last location that contains the backup data which has not been erased by the erasure processing.

7. A method of backing up in a storage apparatus, the method comprising:
   storing data stored in a first memory into a second memory as backup data;
   restoring the backup data backed up in the second memory to the first memory and erasing the backup data stored in the second memory;
   terminating, upon a power failure occurring during an erasure processing for the erasing, the erasure processing; and
   re-backing up data in the first memory that corresponds to the backup data erased from the second memory to the second memory before the erasure processing is terminated, and
   wherein the re-backing up starts from a location subsequent to a last location that contains the backup data which has not been erased by the erasure processing.

8. The method of backing up according to claim 7, wherein the location is a block following a last block of the memory storing the backup data that has not been erased.

* * * * *